United States Patent
Nikkelen (10) Patent No.: US 7,257,403 B2
(45) Date of Patent: Aug. 14, 2007

(54) SERVICE-BASED INTER-SYSTEM HANDOVER

(75) Inventor: Vincent Nikkelen, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 381 days.

(21) Appl. No.: 10/137,703

(22) Filed: May 3, 2002

(65) Prior Publication Data

US 2003/0207688 A1    Nov. 6, 2003

(51) Int. Cl.
*H04Q 7/20*    (2006.01)
(52) U.S. Cl. .................. 455/436; 455/438; 455/439; 370/331
(58) Field of Classification Search ............. 455/432.1, 455/432.2, 436–440, 452, 560, 561, 453; 375/331–333, 335
See application file for complete search history.

(56) References Cited

U.S. PATENT DOCUMENTS

| | | | | |
|---|---|---|---|---|
| 6,216,004 | B1 * | 4/2001 | Tiedemann et al. ......... | 455/442 |
| 6,493,555 | B2 * | 12/2002 | Saada et al. ................. | 455/438 |
| 6,501,953 | B1 * | 12/2002 | Braun et al. ................. | 455/436 |
| 6,650,899 | B1 * | 11/2003 | Stumpert ..................... | 455/436 |
| 2002/0072371 | A1 * | 6/2002 | Hokkanen ................... | 455/438 |
| 2002/0160777 | A1 * | 10/2002 | Takao et al. ................. | 455/436 |
| 2003/0114158 | A1 * | 6/2003 | Soderbacka et al. ........ | 455/436 |
| 2004/0029587 | A1 * | 2/2004 | Hulkkonen et al. ......... | 455/436 |
| 2004/0156329 | A1 * | 8/2004 | Bck et al. .................... | 370/328 |

FOREIGN PATENT DOCUMENTS

| | | |
|---|---|---|
| EP | 1 102 511 | 5/2001 |
| GB | 2352586 | 1/2001 |
| WO | 02/065789 | 8/2002 |

(Continued)

OTHER PUBLICATIONS

*Technical Specification, 3GPP TS 23.009 v3.9.0* (Dec. 2001), 3rd Generation Partnership Project: Technical Specification Group Core Network; Handover procedures (Release 1999).

(Continued)

*Primary Examiner*—Duc M. Nguyen
*Assistant Examiner*—Anthony S. Addy
(74) *Attorney, Agent, or Firm*—Nixon & Vanderhye P.C.

(57) ABSTRACT

The present invention facilitates control over inter-system handover between different types of radio access technologies. Assuming a radio connection has been established between a first mobile radio communications system and a user equipment (UE) using an anchor node, a request is made for handover of the UE connection to a second mobile radio communications system that includes a non-anchor node. UE handover information is provided to the non-anchor node. The UE handover information includes first radio handover information relating to handover of the connection from the first mobile radio communication system to the second mobile radio communication system and second handover information relating to handover from the second mobile radio communications system to the first mobile radio communications system. The non-anchor node forwards to a node in the target network the UE handover information having the protocol format recognized by that node. As a result, the node can readily interpret the information element to determine if the UE subscription and/or type of call warrant or permit a subsequent inter-system handover.

37 Claims, 6 Drawing Sheets

FOREIGN PATENT DOCUMENTS

| | | |
|---|---|---|
| WO | 02/065808 | 8/2002 |
| WO | 02/093955 | 11/2002 |

OTHER PUBLICATIONS

3GPP TS 25.413 v4.30.0 (Dec. 2001); 3$^{rd}$ Generation Partnership Project; Technical Specification Group Radio Access Network; UTRAN Iu interface Signaling RANAP(Release 4).

3GPP TS 23.009 v4.0.0 (Mar. 2001), 3$^{rd}$ Generation Partnership Project; Technical Specification Group Core Network; Handover Procedures (Release 4).

3GPP TS 29.010 v4.2.0 (Dec. 2001), 3$^{rd}$ Generation Partnership Project; Technical Specification Group Core Network; Information element mapping between Mobile Station—Base Station System (MS-BSS) and Base Station System—Mobile-services Switching Centre (BSS-MSC); Signalling procedures and the Mobile Application Part (MAP), Release 4).

3GPP TS 48.008 v4.5.0 (Sep. 2001), 3$^{rd}$ Generation Partnership Project; Technical Specification Group GSM EDGE Radio Access Network; Mobile-services Switching Centre—Base State System, (MSC -BSS) interface; Layer 3 specification (Release 4).

3GPP TSG CN WG4 Meeting #14 (Change Request 29.002 CR 444 v3.12.0), Budapest, Hungary, May 13-17, 2002; Addition of Service Handover Parameters to MAP Handover Messages; N4-020598.

3 GPP 29.002, v5.0.0., Mobile Application Part (MAP) specification.

3 G TS 29.010 v3.0.0 (Sep. 1999) 3$^{rd}$ Generation Partnership Project: Technical Specification Group Core Network; Information Element Mapping Between Mobile Station-Base Station System (MS-BSS) and Base Station System—Mobil Services Switching Centre (BSS-MSC); Signalling Procedures, Sep. 1999, pp. 1-41, XP002137977.

International Search Report PCT/SE03/00696 dated Jul. 28, 2003.

3GPP TR R3.012 V0.4.0 (Jul. 2002) Technical Report "3$^{rd}$ Generation Partnership Project; Technical Specification Group" (TSG) RAN3; Shared Network Support in Connected Mode (Release 5); ftp://ftp.3gpp.org/tsg_ran/WG3_lu/R3_internal_TRs/R3. 012_Shared_network/v0.4.0/R3-021809 TR R3.012 V0.4.0.zip.

3GPP TS-RAN WG3 TSGR3 Meeting #31, Arlanda, Sweden Aug. 12-23, 2002; Tdoc R3-022171 "Shared Networks in RANAP—Information Transfer" Nortel/Siemens; ftp://ftp.3gpp.org/tsg_ran/WG3_lu/TSGR3_31/Docs/R3-022171_CR504r2 (Shared Network in RANAP—Info Trans).zip.

EPO Search Report dated Jul. 24, 2003.

International Search Report mailed Nov. 25, 2003 in corresponding PCT Application PCT/SE03/01342.

U.S. Appl. No. 10/245,720.

* cited by examiner

Inter MSC, GSM to UMTS handover

Fig. 4

BSSMAP Service Handover
Information Element

Fig. 5

RANAP Service Handover
Information Element (IE)

| IE/Group Name | Presence | Range | IE Type and Reference | Semantics Description |
|---|---|---|---|---|
| Service Handover | M | | Enumerated (HO to GSM should be performed, HO to GSM should not be performed, HO to GSM shall not be performed) | |

Fig. 6

Inter MSC, UMTS to GSM handover

Fig. 7

Inter MSC, UMTS to UMTS handover

Fig. 8

Inter MSC, GSM to GSM handover

Fig. 9

SERVICE-BASED INTER-SYSTEM HANDOVER

FIELD OF THE INVENTION

The present invention relates to mobile radio systems that support handover procedures, and in particular, inter-system handover procedures.

BACKGROUND AND SUMMARY OF THE INVENTION

Since the first public mobile radio systems introduced in the late 1970's and early 1980's, several generations of mobile radio communication systems have evolved in different parts of the world. First generation systems included, for example, the Advanced Mobile Phone System (AMPS) in the United States, Nordic in Scandinavia, Total Access Communications System (TACS) in Great Britain, and Nippon Mobile Telephone System (NAMTS) in Japan. Each of these first generation (1G) systems had similar transmission characteristics such as analog frequency modulation at the radio and digital control of the network. Second generation (2G) systems based on Time Division Multiple Access (TDMA) included Global System for Mobile communications (GSM) which became the standard in Europe followed in the United States by Digital AMPS (DAMPS), the TDMA version of which is sometimes referred to by its standardization name, IS-54. The Japanese second generation system was called Personal Digital Cellular (PDC). Work is currently ongoing in third generation (3G) systems that are based on a Wideband Code Division Multiple Access (WCDMA) air interface. An example of a 3G system is a Universal Mobile Telecommunication System (UMTS). Other air interfaces that can be used to provide third generation services include Enhanced Data rate for GSM Evolution (EDGE) and multicarrier CDMA sometimes referred to as CDMA 2000.

Third generation systems permit backward compatibility with other earlier types of radio systems such as GSM to allow multi-mode user equipments (UEs) to obtain service from both 2G and 3G systems. This requires that the multi-mode UEs and the 2G and 3G infrastructures support an inter-system handover from a cellular system that employs one type of radio access technology (RAT) to another cellular system that employs a different type of radio access technology, e.g., from GSM/TDMA to UMTS/CDMA. Commonly-assigned U.S. patent application Ser. No. 09/286,472, filed on Apr. 6, 1999, and entitled "Inter-System Handover—Generic Handover Mechanism," describes one mechanism for accomplishing such inter-system handovers, the disclosure of which is incorporated herein by reference.

Although having inter-system handover functionality is a desirable capability to offer to subscribers, network operators also want to control access to such inter-system handover functionality. Indeed, certain subscribers may need to be prevented from accessing certain types of mobile radio communication systems, or even from performing any type of inter-system handover. For example, subscribers who have only paid for GSM service should not normally be able to perform a handover to obtain Wideband CDMA services without paying for those Wideband CDMA services. On the other hand, operators may want to allow inter-system handover for all subscribers in very limited circumstances, such as an emergency call. In addition to subscriber policing functions, network operators want the ability to move subscribers from one radio access technology to another. One example is handing over UMTS subscribers making a speech-only call to a GSM system to free capacity in the UMTS system (designed for multimedia services), while still providing the subscriber the same quality of service for the speech-only call using the less expensive GSM system (designed primarily for speech services).

General handover procedures are specified by the Third Generation Partnership Project (3GPP) in 3GPP 23.009, Version 4.0.0, entitled "Handover Procedures." A service handover Information Element (IE) is specified for use in instructing a radio access network node, such as a Radio Network Controller (RNC), how to implement inter-system handovers. However, these general procedures are not adequate to properly facilitate desirable operator control of various inter-system handover situations.

When a service handover information element is provided to a decision making node in the target network to which an inter-system handover is requested, that node can determine how to handle the system handover request, including whether to permit the handover. Consider the example situation illustrated in FIG. 1 where a UE is requesting an inter-system handover from a GSM system to a WCDMA/UMTS system (HO#1). The GSM system includes an "anchor" Mobile services Switching Center (MSC) through which the original radio connection with the user equipment is established via a serving Base Station Controller (BSC) and radio Base Station (BS). To request a handover from the GSM system to the WCDMA system, the anchor MSC sends a handover request message over an E-interface to a "non-anchor" MSC in the WCDMA system. That request includes a service handover information element associated with the UE and/or UE connection. The information element is necessary because the non-anchor MSC is not aware of the UE's subscription or the type of call in the UE connection. The non-anchor MSC provides the service handover information element over an Iu interface to the serving RNC that will decide if a subsequent inter-system handover request should be executed. In order to determine if the subsequent inter-system handover is permitted or desired by the network operator, the RNC checks the specific data provided in the service handover information element.

Figure 1:
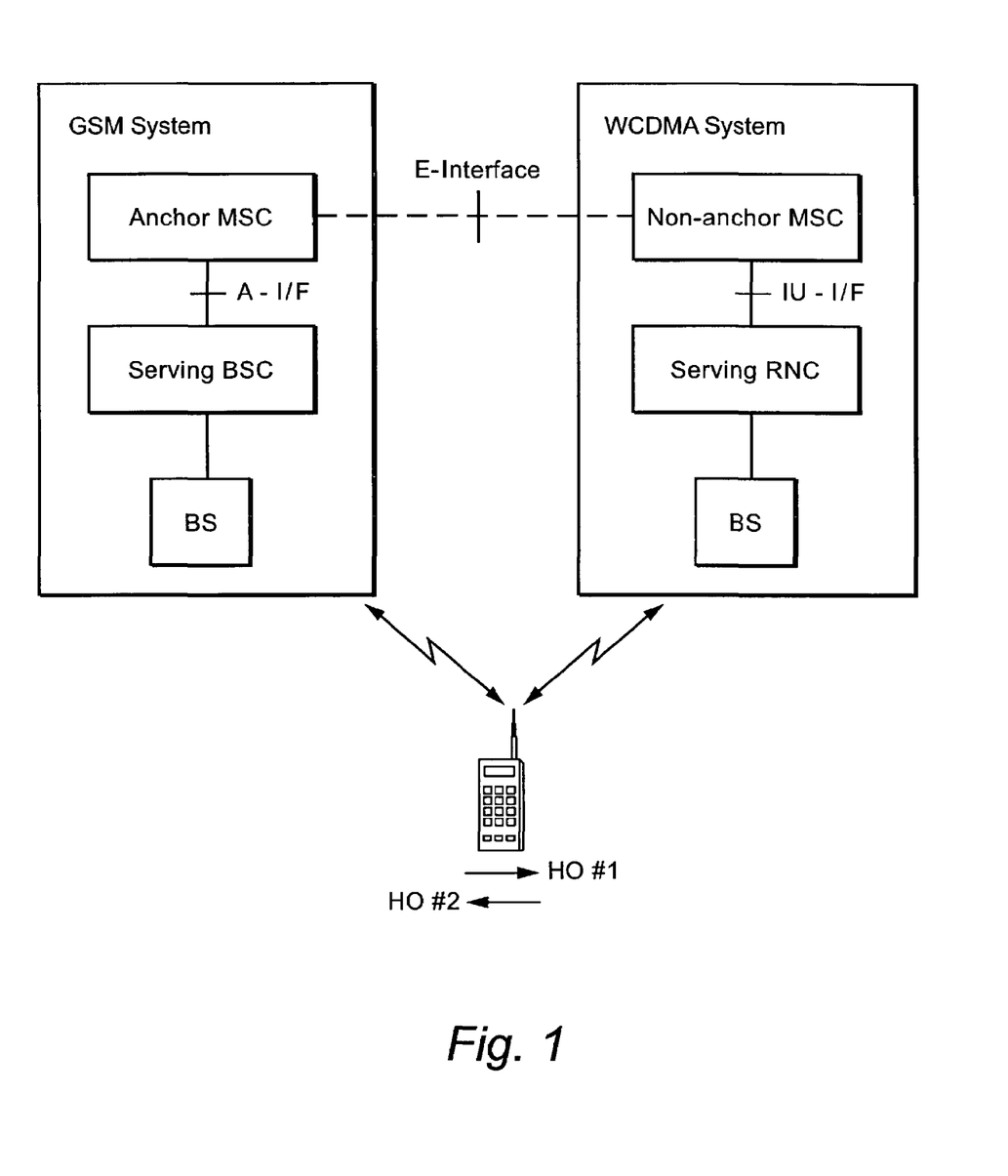
FIG. 1 illustrates an example inter-system handover situation.

In this example, the UE connection is set up in a GSM system, and the BSC provides the anchor MSC with a "Handover Required" message. The anchor MSC can encapsulate this information or otherwise transfer it over the E-interface to the non-anchor MSC. One problem in this situation is the non-anchor MSC is not a GSM MSC—it is a WCDMA/UMTS MSC using WCDMA/UMTS protocols. Unlike the anchor MSC, the non-anchor cannot interpret the service handover information element based on subscriber information. Nor does it have access to the UE subscription and information about the UE connection, e.g., a normal call, an emergency call, a speech call, a data call, etc. Only the anchor MSC involved in the initial connection setup "knows" the UE subscription and UE connection information. As a result, the non-anchor MSC cannot readily interpret the service handover information element in the GSM-related protocol format. Nor can it easily translate the GSM-based service handover information element into a corresponding WCDMA-based service handover information element that would be understood by the serving RNC which is responsible for determining whether the subsequent handover should be permitted (requested by UE) or promoted (desired by network operator). Although the non-anchor MSC can readily pass the GSM-based service handover information element to another BSC, if the target system was another GSM system, that is not the case here.

A similar problem exists for subsequent inter-system handover requests for the UE connection. Assume the same UE later requests an inter-system handover from the WCDMA/UMTS system back to the same GSM system (or to some other GSM system), as represented by the arrow in the HO#2 shown in FIG. 1. Because the non-anchor MSC only received the WCDMA/UMTS service handover information element, the anchor MSC lacks information necessary to interpret or otherwise translate a WCDMA/UMTS service handover information element into a GSM service handover information element. The problem propagates for each subsequent inter-system handover request. This problem in the non-anchor MSC exists even if an inter-system handover is requested that does not require an inter-MSC handover, i.e., a single, non-anchor MSC supports a BSC node (GSM) and an RNC node (WCDMA/UMTS). This is called an inter-system, intra-MSC handover. That non-anchor MSC does not have the ability to send a GSM service handover information element to the BSC node as well as an WCDMA/UMTS service handover information element to the RNC node depending on what is needed.

As a result, the non-anchor MSC may neither block nor promote inter-system handover to certain radio access technologies based upon a mobile UE subscription. As a result, the administration of inter-system handover based on subscription or call type must be handled from the anchor MSC which complicates administration of the inter-system handover functionality. The present invention overcomes these problems and facilitates operator control over inter-system handover between different types of radio access technologies. Assuming a radio connection has been established between a first mobile radio communications system and a User Equipment (UE) using an anchor node, a request is made for handover of the UE connection to a second mobile radio communications system that includes a non-anchor node. UE handover information is provided to the non-anchor node. The UE handover information includes first radio handover information relating to handover of the connection from the first mobile radio communication system to the second mobile radio communication system and second handover information relating to handover from the second mobile radio communications system to the first mobile radio communications system.

The non-anchor node forwards one of the first and second UE handover information to a radio access network node in the target system that decides whether to permit or initiate a subsequent requested inter-system handover of the connection. The first handover information element is formatted in accordance with a first protocol format employed in the first system, and the second information element is formatted in accordance with a second protocol format employed in the second system. The non-anchor node provides the handover information element in the protocol format recognized by the inter-system handover decision making node. As a result, the radio access network node readily determines from the information element whether the UE subscription and/or type of call warrants an inter-system handover.

The information elements may indicate whether the handover from the first system to the second system is permissible, and whether and handover of the connection in the other direction from the second to first system is permissible. Other more qualified handover conditions may also be provided in the information element, e.g., an indication whether handover to the second system (or the first system) should not be performed unless there are no resources available in the first (second) system.

In one non-limiting, example application, the first and second mobile radio communication systems correspond to GSM-type and UTRAN-type systems. The GSM-type system includes a GSM-supporting MSC coupled to at least one Base Station Controller (BSC) which controls plural radio base stations. The UTRAN-type system includes a UTRAN-supporting MSC coupled to at least one Radio Network Controller (RNC) which controls plural radio base stations. Assuming a radio connection is established between the GSM system and a user equipment (UE) using an anchor MSC, the anchor MSC processes an inter-system handover request for the UE connection from BSC to the UTRAN system. The anchor MSC provides service handover information for the UE to the non-anchor MSC in the UTRAN system.

The service handover information includes a GSM-formatted handover information element and a UTRAN-formatted handover information element. The GSM handover information element relates to handover of the connection from the GSM to the UTRAN system. The UTRAN information element relates to handover from the UTRAN to the GSM system.

In this way, the non-anchor MSC in the UTRAN network has service handover information for that UE subscription and connection formatted both for ready communication with the RNC node in the UTRAN system and for ready communication with a BSC node in the GSM system (or some other GSM system). With this properly-formatted service handover information, the non-anchor MSC can intelligently facilitate subsequent inter-system handover requests. For subsequent GSM-to-UTRAN handover requests, the non-anchor MSC can provide a UTRAN-formatted service handover information element to an RNC. For subsequent UTRAN-to-GSM handover requests, the non-anchor MSC can provide a GSM-formatted service handover information element to a BSC.

BRIEF DESCRIPTION OF THE DRAWINGS

The foregoing and other objects, features, and advantages of the present invention may be more readily understood with reference to the following description taken in conjunction with the accompanying drawings.

DETAILED DESCRIPTION

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details. Therefore, even though example embodiments are described below with respect to second generation systems such as GSM and third generation systems such as UTRAN/UMTS, the fundamental aspects of this invention are generically applicable to any kind of inter-system handovers. Nor is the present invention limited to inter-system handovers between two mobile radio communication systems. To the contrary, the invention may be employed in any inter-system handover between any two or more mobile radio communication systems.

In some instances, detailed descriptions of well-known methods, interfaces, devices, and signaling techniques are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

To perform an inter-system handover, a multi-mode UE is typically required, i.e., a UE capable of communicating with at least two different types of mobile radio communication systems that use different communication and/or signaling protocols. An example of such a multi-mode UE is a UE that can communicate with both a GSM-and UMTS-type of mobile radio communication system. It is to be understood, however, that the present invention provides an inter-system handover procedure applicable regardless of the communication protocol of the systems involved in the handover or the type of multi-mode user equipment employed.

Figure 2:
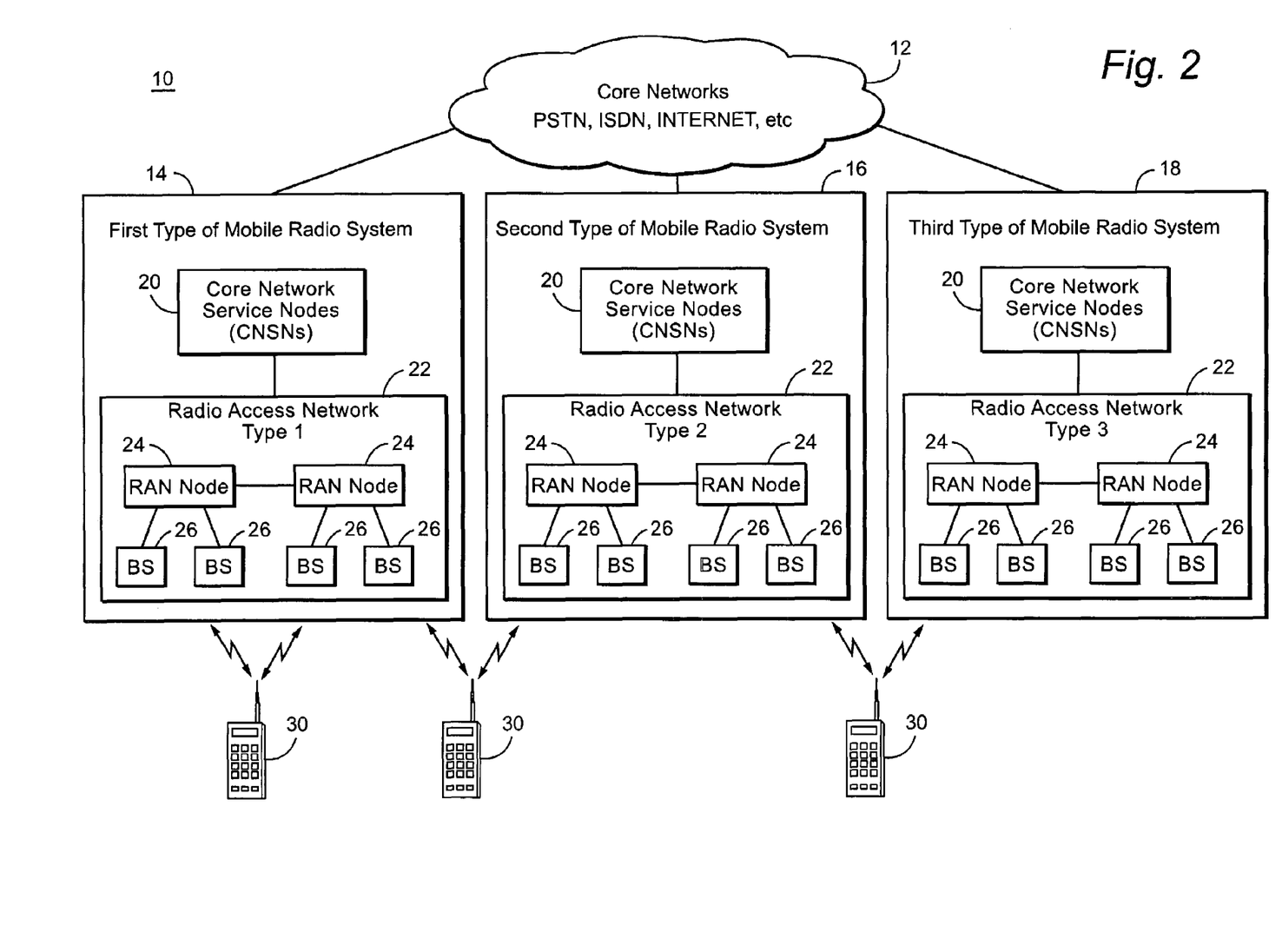
FIG. 2 illustrates a system in which there are plural types of mobile radio systems that permit, at least under some circumstances, inter-system handovers of mobile UE radio connections.

Reference is now made to a communications system illustrated in FIG. 2 and indicated generally at 10. The communications system 10 includes first, second, and third mobile radio communication systems 14, 16, and 18, respectively, that employ three different types of radio access technology. Three different types of mobile radio communication systems are shown for purposes of illustration. However, other scenarios are possible: only two different types of radio access technology may be employed among the three systems; only two different mobile radio communication systems maybe employed with different radio access technologies; and more that three mobile radio communication systems may be employed with two or more different radio access technologies. Because each mobile radio communication system 14, 16, and 18 uses different radio access technology, each employs different communication and/or signaling protocols.

Each mobile radio system 14, 16, and 18 is coupled to one or more core networks represented generally as a cloud 12. Example core networks include a Public Switched Telephone Network (PSTN), an Integrated Service Digital Network (ISDN), the Internet, etc. Each mobile radio system 14, 16, and 18 includes one or more Core Network Service Nodes (CNSNs) 20 coupled to a generic Radio Access Network (RAN) 22. The radio access network 22 typically includes one or more generic RAN nodes 24 which communicate together. Each RAN node controls plural generic radio base stations (BSs) 26. Communications with mobile radio User Equipment (UE) 30 are by way of a radio interface. Two of the UEs 30 are shown "between" two of the mobile radio communication systems representing inter-system handovers. The technical details of each core network service node and radio access network, such as a GSM, DAMPS, UMTS, CDMA 2000, etc., are well known and are not necessary for an understanding of the present invention which relates to inter-system handover.

Figure 3:
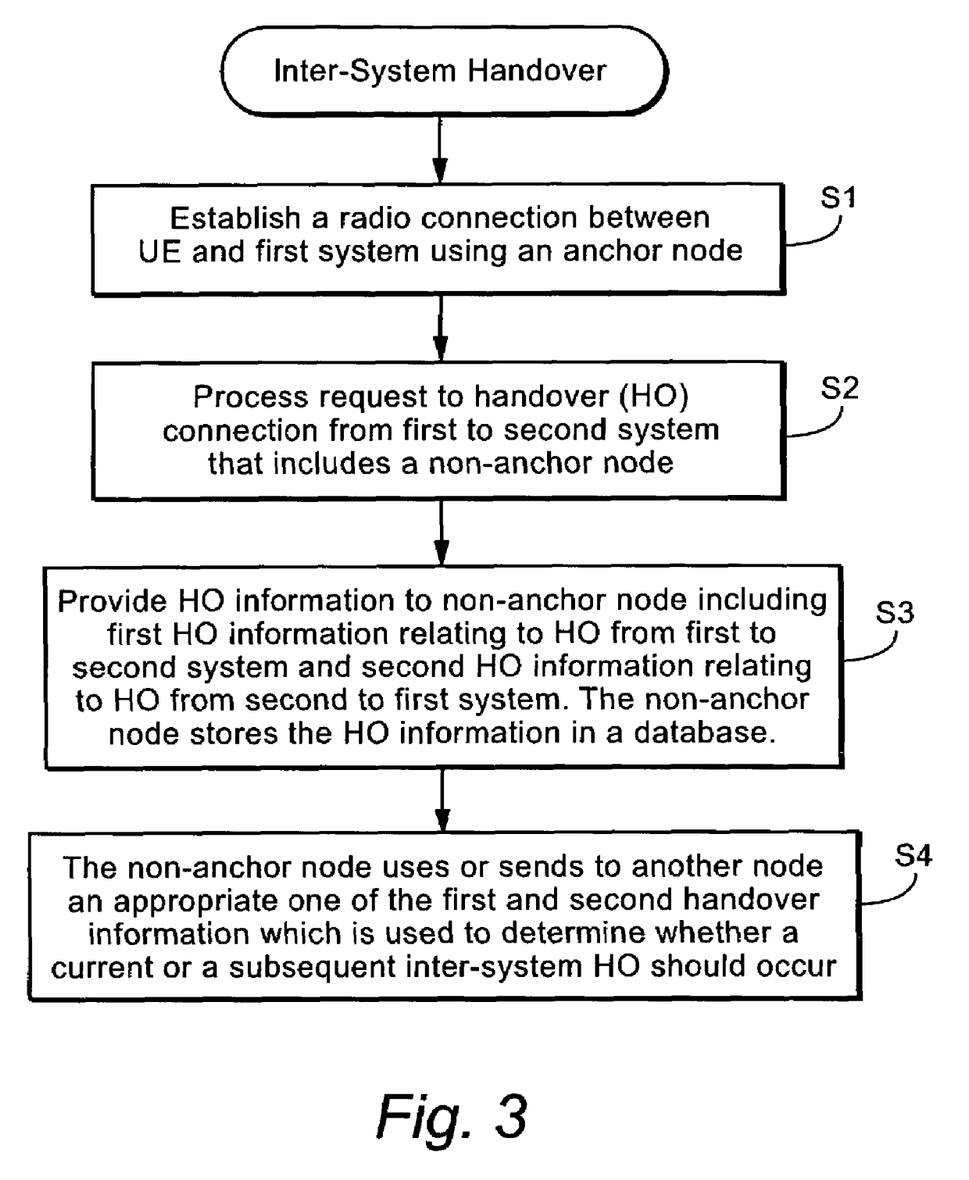
FIG. 3 is a flowchart illustrating example procedures for performing an inter-system handover in accordance with one example of the present invention.

Regarding inter-system handover, reference is now made to inter-system handover procedures illustrated in FIG. 3 in accordance with one non-limiting, example embodiment of the present invention. Initially, a radio connection is established between a UE and a first mobile communications system using an anchor node in that first system (step S1). The anchor node is used in establishing the initial radio connection with the UE. An example of an anchor node is a Mobile services Switching Center (MSC). Assume that the UE is moving away from or out of coverage of the first system toward a second mobile communications system to the point where a handover of the radio connection is either necessary or desirable. A request is made in the first system for handover of the UE radio connection to the second system which includes a non-anchor node (step S2). A non-anchor node is a node that does not originate/initiate a radio connection but, as a result of handover of the radio connection, becomes responsible for supporting that connection in that second system.

The anchor node is "intelligent" with respect to the details/characteristics of this radio connection and the UE's subscription. On the other hand, the non-anchor node is "dumb" with respect to those the details/characteristics. As a result, when an inter-system handover is requested, the non-anchor node is unaware of whether the UE connection should be transferred to another radio communications system. Nor is the non-anchor aware whether the UE connection should be handed over for subsequent inter-system handover requests. Accordingly, the anchor node (or some other entity that has information about the UE's connection and subscription) provides the details/characteristics of this radio connection and the UE's subscription to the non-anchor node so that the non-anchor node becomes "intelligent" at least with regard to inter-system handovers. That provided information is referred to as "handover information."

In the example in FIG. 3, the handover information includes first handover information relating to handover from the first to the second system and second handover information relating to handover from the second to the first system. The non-anchor node stores this handover information in the database (step S3). Using the first and/or second handover information, the non-anchor node forwards the appropriately-formatted handover information to the node that will decide whether a subsequent inter-system handover is permitted or desired for this UE connection and subscriber. If permitted or desired, that decision could be made in the non-anchor node. However, the decision is more likely to be made by a radio access network node in a source system that requests the handover.

Ultimately, the non-anchor node is enabled to provide handover information in the appropriate protocol/format of the node that will be deciding whether the inter-system handover is permitted. Although only two systems and two sets of handover information were described, more than two sets of handover information may be used if inter-system handover is possible between more than two systems.

Figure 4:
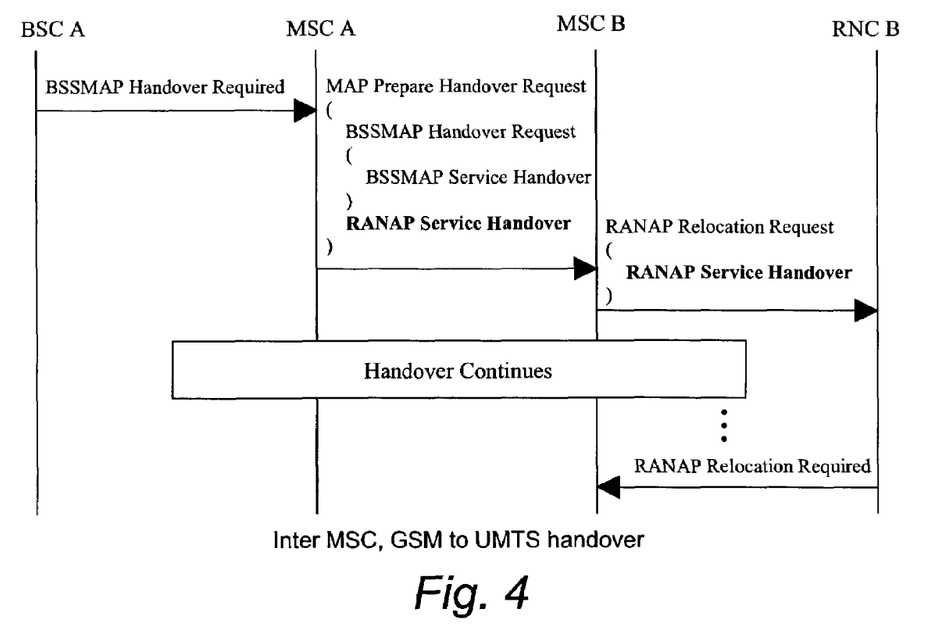
FIG. 4 is a simplified signaling diagram for an example inter-system handover in which the present invention is employed.

Consider an example scenario where the first mobile communications network is a GSM system and the second mobile communications network is a UTRAN/UMTS system. FIG. 4 shows a simplified signaling diagram where an inter-system handover is requested from the GSM system to the UTRAN/UMTS system. The signaling diagram assumes that a UE connection has been established and that an inter-system handover has been requested for that connection. The anchor base station controller (BSC A) sends a handover request message using a GSM-based signaling protocol over the GSM A interface. The GSM protocol is the Base Station Subsystem Mobile Application Part (BSS-MAP) protocol. The handover request message is a BSS-MAP Handover Required message sent to the anchor MSC A in the GSM system.

The anchor MSC A prepares a handover request message to be sent to the non-anchor MSC in the UTRAN/UMTS system (MSC B). The signaling protocol used between MSCs is called the Mobile Application Part (MAP) protocol. Accordingly, the anchor MSC A prepares a MAP Prepare Handover Request message that includes handover information for this UE connection in the form of two service handover information elements. One element is formatted in accordance with the GSM protocol, and the other element is formatted in accordance with the UTRAN/UMTS protocol.

Figure 5:
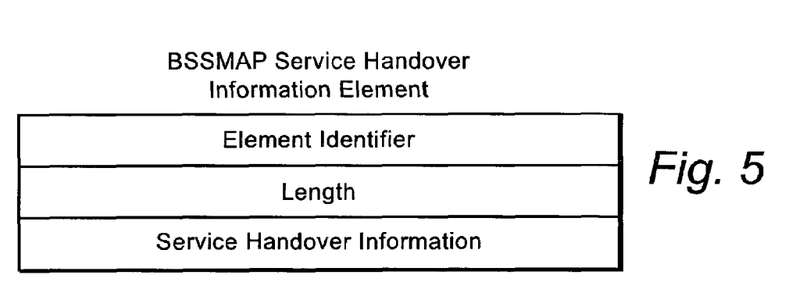
FIG. 5 illustrates one example of a GSM-type service handover information element.

In this regard, a BSS MAP service handover information element is illustrated in FIG. 5 and includes an element identifier field, a length field, and a field that contains the actual service handover information. The service handover information, for example, may be coded using three bits. If the bits have the value 000, then a handover from GSM to UTRAN (or CDMA 2000) should be performed if requested. If the bits are set to 001, a handover to UTRAN (or CDMA 2000) should not be performed unless there are no resources available in the GSM system. If the bits have the value 010, handover to UTRAN (or CDMA 2000) shall not be performed under any circumstances. Of course, this service handover information can include additional bit combinations and/or bits to address indicate different handover instructions for a UE connection.

Figure 6:
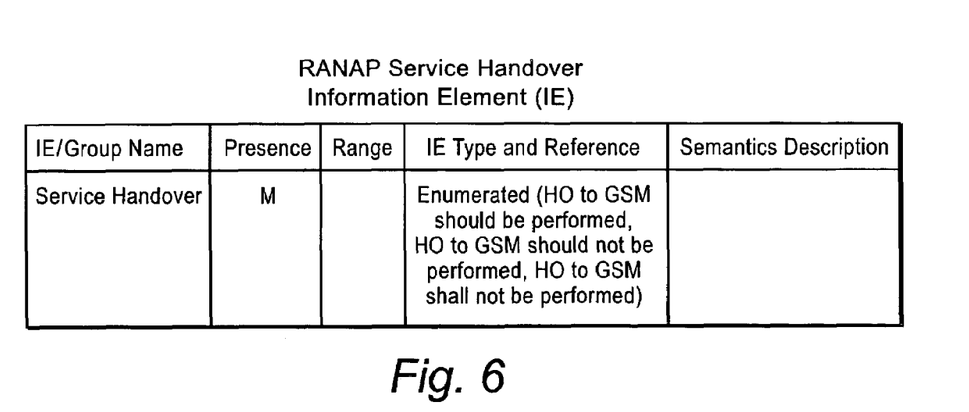
FIG. 6 illustrates one example of a UTRAN-type service handover information element.

A service handover element formatted in accordance with a UTRAN/UMTS signaling protocol is shown in FIG. 6 and is referred to as a RANAP service handover information element. This element indicates whether an inter-system handover to GSM should, should not, or shall not be performed for the particular UE connection in question. The information element (IE)/group name field identifies this element as service handover IE. The presence field indicates that it is a mandatory (M) field within the information element. Its information element type and reference are enumerated one of the instructions indicated in the parenthetical: handover to GSM should be performed; handover to GSM should not be performed; or handover to GSM shall not be performed.

Returning to the signaling diagram in FIG. 4, the non-anchor MSC B receives from the anchor MSC A both the BSSMAP service handover information element, by encapsulating the BSSMAP Handover Request message derived from the received BSSMAP Handover Required message from BSC A. The non-anchor MSC B stores the BSSMAP service handover information element and the RANAP service handover information element, for example, in a database. In addition, the non-anchor MSC B forwards the RANAP service handover information element in an RANAP Relocation Request message sent to RNC B in the UTRAN/UMTS network. In this example, the RNC B makes the decision whether to make, or permit if requested, a subsequent inter-system handover based upon the information contained in the delivered RANAP service handover information element. The information contained in that element is determined, for example, by the UE's subscription, the type of call, the network operator, or by one or more other factors.

A subsequent inter-system handover request is shown in FIG. 4 being made using an RANAP Relocation Request message sent from RNC B to MSC B. The non-anchor MSC B selects the service handover information element formatted for the type of target system for which the inter-system handover is requested. The non-anchor MSC B sends the selected service handover information element to an MSC in the target system or to a radio access network node in the target system, e.g., BSC, RNC, etc. In the case where the non-anchor MSC is coupled to two different types of radio access technology nodes, e.g., a BSC and an RNC, an inter-system, intra-MSC handover can occur. In both inter-system, inter-MSC handovers and inter-system, intra-MSC handovers, the non-anchor MSC is able to pass along the appropriate service handover information element in the format understood by the receiving node in the target system without the need for format translation or other additional signaling.

Figure 7:
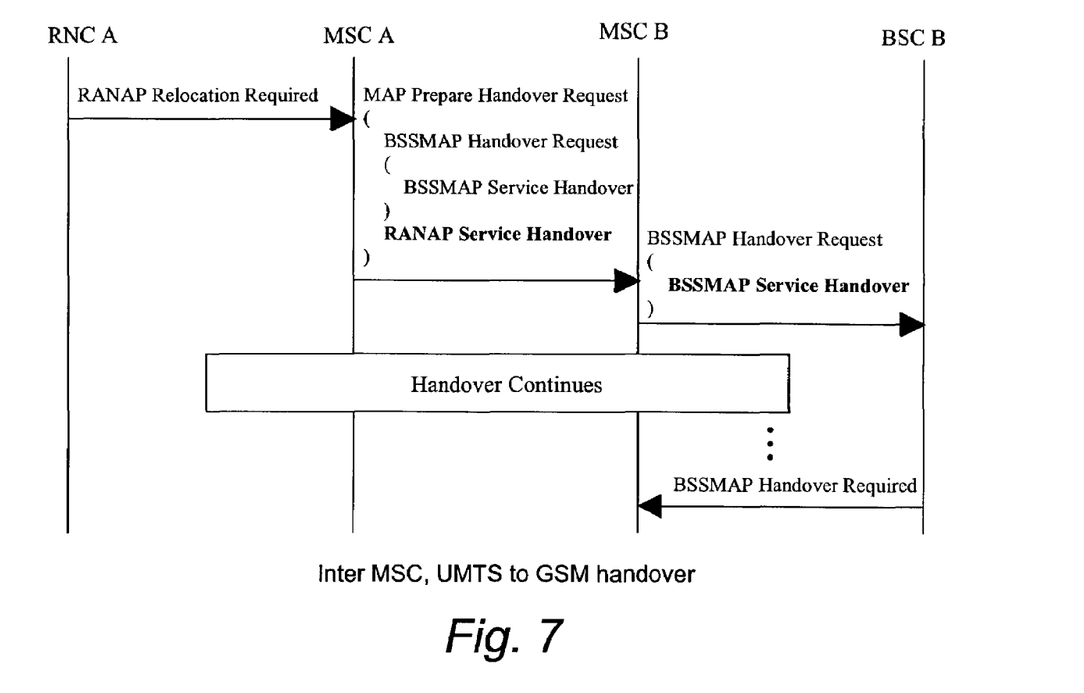
FIGS. 7-9 are simplified signaling diagrams for example inter-system handover scenarios in which the present invention is employed.

Additional examples will now be described using the examples shown in FIGS. 7-9. FIG. 7 illustrates a signaling diagram for an inter-system, inter-MSC handover from a UTRAN/UMTS system to a GSM system. The anchor RNC A for the UE connection sends an RANAP Relocation Required message to the anchor MSC A in the UMTS system. The anchor MSC A prepares a MAP Prepare Handover Request message which includes (1) the BSSMAP service handover information element encapsulated in a BSSMAP Handover Request message and (2) a corresponding RANAP service handover information element. The non-anchor MSC B receives both the BSSMAP and RANAP service handover information elements, stores them in a database, and selects the appropriately-formatted service handover information element to be sent to the non-anchor radio access node BSC B. In this case, the appropriate service handover request message is the BSSMAP service handover information element formatted in the GSM protocol understood by both MSC B and BSC B.

The non-anchor MSC B can now intelligently handle subsequent inter-system handover requests or make a subsequent inter-system handover if desired by the network operator. An example is shown in the BSSMAP Handover Required message from the BSC B to the MSC B. If the target system is GSM, the MSC B can forward the BSSMAP service handover information element. If the target system is UMTS, the MSC B can forward the RANAP service handover information element.

The present invention is also useful even when the initial handover is between two mobile communication systems of the same type. One example of this is shown in the simplified signaling diagram of FIG. 8 illustrating an initial UMTS-to-UMTS handover. The anchor RNC A for the UE connection indicates a request for a handover by sending an RANAP Relocation Required message to the anchor MSC A. The anchor MSC A sends the MAP Prepare Handover request message with the encapsulated RANAP Relocation Request containing the RANAP service handover information element and the BSSMAP service handover information element for this UE connection. The non-anchor MSC B stores both service handover information elements in a database, and sends the RANAP service handover information element in an RANAP Relocation Request message to the non-anchor RNC B in the new UMTS system. The non-anchor RNC B analyzes the information in that RANAP service handover information element in order to decide whether to grant a subsequent inter-system handover of the UE connection or make a subsequent inter-system handover if desired by the network operator.

Figure 9:
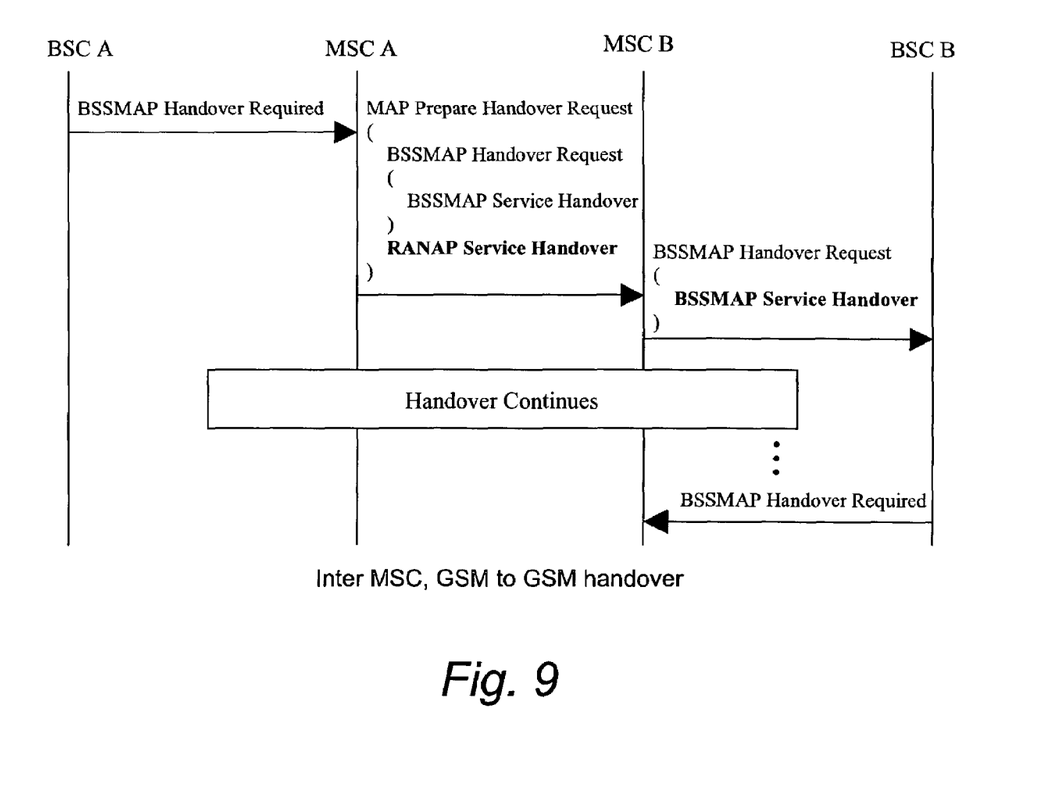

As shown in FIG. 9, the non-anchor RNC B requests an inter-system handover by sending the RANAP Relocation Required message from the RNC B to the MSC B. If the target system is GSM, the MSC B can forward the BSSMAP service handover information element. If the target system is UMTS, the MSC B can forward the RANAP service handover information element.

Figure 8:
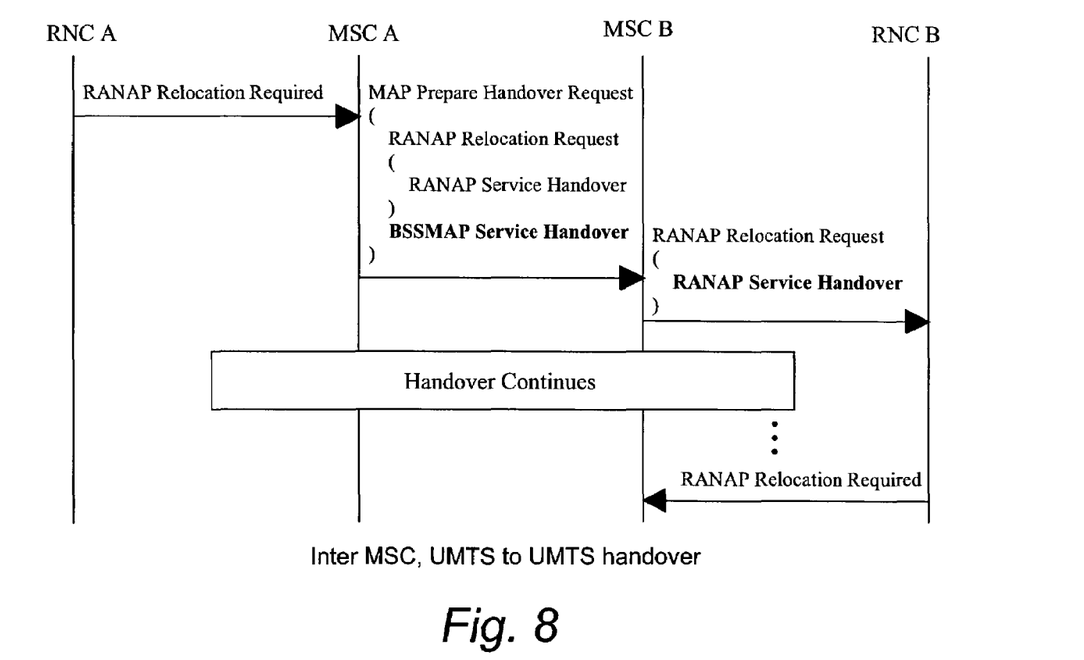

FIG. 9 is another example similar to FIG. 8 in the sense that the initial handover is between two MSCs in the same type of mobile radio communications system: an inter-MSC, GSM-to-GSM handover. The anchor BSC A sends a BSS-MAP Handover Required message to the anchor MSC A. The MSC A generates a MAP Prepare Handover Request message and sends it to the non-anchor MSC B. The MAP Prepare Handover Request message encapsulates the BSS-MAP Handover Request message that includes the BSS-MAP service handover information element and includes the RANAP service handover information element. Non-anchor MSC B sends the BSSMAP service handover information element to the non-anchor BSC B which analyzes that information element in order to determine whether to permit a subsequent requested inter-system handover or make a subsequent inter-system handover if desired by the network operator.

As shown in FIG. 9, the non-anchor BSC B requests an inter-system handover by sending the BSSMAP Handover Required message from the BSC B to the MSC B. If the target system is GSM, the MSC B can forward the BSSMAP service handover information element. If the target system is UMTS, the MSC B can forward the RANAP service handover information element.

While the present invention has been described with respect to particular embodiments, those skilled in the art will recognize that the present invention is not limited to these specific exemplary embodiments. Different formats, embodiments, and adaptations besides those shown and described as well as many variations, modifications, and equivalent arrangements may also be used to implement the invention. Therefore, while the present invention has been described in relation to its preferred embodiments, it is to be understood that this disclosure is only illustrative and exemplary of the present invention. Accordingly, it is intended that the invention be limited only by the scope of the claims appended hereto.

What is claimed is:

1. A method for controlling handover of radio connections between first and second mobile radio communication systems that use different types of radio access technology, comprising:

for a radio connection between the first mobile radio communications system and a user equipment (UE) established using an anchor node, processing a handover request for the UE connection to the second mobile radio communications system that includes a non-anchor node;

constructing handover information based on UE subscription information for a subscriber associated with the UE and mobile communications system operator information representing rights of the subscriber associated with the UE regarding changing between different types of radio access technologies, the handover information including first handover information indicating whether handover of the connection from the first mobile radio communications system to the second mobile radio communications system is permitted and second handover information indicating whether handover from the second mobile radio communications system to the first mobile radio communications system is permitted, wherein the UE handover information includes a first handover information element formatted in accordance with a first format employed in the first mobile radio communications system and a second handover information element formatted in accordance with a second format employed in the second mobile radio communications system;

providing handover information by the anchor node for the UE to the non-anchor node in the second mobile radio communications system; and using the provided UE handover information to determine whether to permit a handover of the connection from the first mobile radio communications system to the second mobile radio communications system and from the second mobile radio communications system to the first mobile radio communications system without having to contact the UE or use statistical cell-related information, wherein when the UE handover information indicates that a requested handover is not permitted, preventing the requested handover even though there may be sufficient resources to support the requested handover.

2. The method in claim 1, wherein the UE handover information is stored in an anchor node in the first mobile radio communications system.

3. The method in claim 2, wherein the UE handover information is sent from the anchor node to the non-anchor node before, during, or after the anchor node is processing the handover request.

4. The method in claim 1, wherein the first handover information element includes information in the first format indicating whether a handover of the UE connection to the second mobile radio communications system is permissible or not, and the second handover information element includes information in the second format indicating whether a handover of the UE connection to the first mobile radio communications system is permissible or not.

5. The method in claim 4, wherein the first handover information element includes information in the first format indicating whether a handover of the UE connection to the second mobile radio communications system should not be performed unless no resources are available in the first mobile radio communications system, and the second handover information element includes information in the second format indicating whether a handover of the UE connection to the first mobile radio communications system should not be performed unless no resources are available in the second mobile radio communications system.

6. The method in claim 1, wherein the first mobile radio communications system is a GSM mobile radio communications system and the second mobile radio communications system is a UTRAN or CDMA2000 mobile radio communications system.

7. The method in claim 1, wherein the first mobile radio communications system is a UTRAN or CDMA2000 mobile radio communications system and the second mobile radio communications system is a GSM mobile radio communications system.

8. The method in claim 1, wherein the first mobile radio communications system is a UTRAN or CDMA2000 mobile radio communications system and the second mobile radio communications system is a UTRAN or CDMA2000 mobile radio communications system.

9. The method in claim 1, wherein the first mobile radio communications system is a GSM mobile radio communications system and the second mobile radio communications system is a GSM mobile radio communications system.

10. The method in claim 1, wherein the first mobile radio communications system is one of a first, second, and third generation mobile radio communications system and the second mobile radio communications system is one of a first, second, and third generation mobile radio communications system.

11. The method in claim 1, wherein the anchor node and non-anchor node are mobile service switching center (MSC) nodes.

12. A method for controlling handover of a radio connection between a GSM mobile radio communication system including a GSM supporting mobile services switching center coupled to at least one base station controller (BSC) controlling plural radio base stations and a UMTS terrestrial radio access network (UTRAN) mobile radio communication system including a UTRAN supporting MSC coupled to at least one radio network controller (RNC) controlling plural radio base stations, comprising:

for a radio connection between one of the GSM and UTRAN mobile radio communications system and a user equipment (UE) established using an anchor-MSC, processing a handover request for the UE connection from one of the BSC and the RNC to the other of the GSM and UTRAN mobile radio communications systems;

the anchor-MSC providing service handover information for the UE to a non-anchor MSC in the other mobile radio communications system, where the handover information is based on UE subscription information for a subscriber associated with the UE and mobile radio communications system operator information representing rights of the subscriber associated with the UE regarding changing between different types of radio access technologies and where the handover information includes a GSM handover information element relating to handover of the connection from the GSM mobile radio communications system to the UTRAN mobile radio communications system and a UTRAN handover information element relating to handover from the UTRAN mobile radio communications system to the GSM mobile radio communications system;

using the provided UE handover information to determine whether to permit a subsequent handover of the connection from the other mobile radio communications system to the one mobile radio communications system without having to contact the UE or use statistical cell-related information, wherein when the UE handover information indicates that a requested handover is not permitted, preventing the requested handover even though there may be sufficient resources to support the requested handover; and sending the UE handover information from the anchor MSC to the non-anchor MSC in a mobile application part (MAP) protocol handover request message, wherein the MAP handover request message includes (1) a base station subsystem mobile application part (BSSMAP) protocol handover request message having a BSSMAP service handover information element as the GSM handover information element, and (2) an radio access network application part (RANAP) protocol service handover information element as the UTRAN handover information element.

13. The method in claim 12, further comprising:
storing the UE handover information in the non-anchor MSC.

14. The method in claim 13, further comprising:
the non-anchor MSC receiving a subsequent request for a handover of the UE connection to another mobile radio communications system, and
the non-anchor MSC forwarding the UE handover information to a node in the another mobile radio communications system.

15. The method in claim 12, wherein the anchor MSC encapsulates the BSSMAP handover request message having the BSSMAP service handover information element and adds the RANAP service handover information element to the MAP prepare handover request message.

16. The method in claim 12, wherein the anchor MSC encapsulates the RANAP relocation message having the RANAP service handover information element and adds the BSSMAP service handover information element to the MAP prepare handover request message.

17. The method in claim 12, wherein the BSSMAP service handover information element indicates whether a handover of the UE connection to the UTRAN mobile radio communications system is permissible or not, and the RANAP service handover information element indicates whether a handover of the UE connection to the GSM mobile radio communications system is permissible or not.

18. The method in claim 17, wherein the BSSMAP service handover information element indicates whether a handover of the UE connection to the UTRAN mobile radio communications system should not be performed unless no resources are available in the first mobile radio communications system, and the RANAP service handover information element indicates whether a handover of the UE connection to the GSM mobile radio communications system should not be performed unless no resources are available in the second mobile radio communications system.

19. In the context of a communications network where handover of a user equipment (UE) radio connection established using an anchor node in a first mobile radio communication system is possible between the first mobile radio communication system and a second mobile radio communication system that uses a different type of radio access technology, a non-anchor node operable in the second mobile radio communication system, comprising:

electronic circuitry configured to receive from the anchor node and store handover information for the UE, where the handover information is based on UE subscription information for a subscriber associated with the UE and mobile radio communications system operator information representing rights of the subscriber associated with the UE regarding changing between different types of radio access technologies and where the handover information includes first handover information indicating whether handover of the connection from the first mobile radio communications system to the second mobile radio communications system is permitted and second handover information indicating whether handover from the second mobile radio communications system to the first mobile radio communications system is permitted;

wherein the UE handover information is useable by the non-anchor node or provided to another node to determine whether to permit a handover of the connection from the first mobile radio communications system to the second mobile radio communications system and from the second mobile radio communication system to the first mobile radio communications systems without having to contact the UE or use statistical cell-related information, wherein when the UE handover information indicates that a requested handover is not permitted, the non-anchor node or the another node is configured to prevent the requested handover even though there may be sufficient resources to support the requested handover; and wherein the UE handover information includes a first handover information element formatted in accordance with a first format employed in the first mobile radio communications system and a second handover information element formatted in accordance with a second format employed in the second mobile radio communications system.

20. The non-anchor node in claim 19, further comprising:
a memory,
wherein the UE handover information is stored in the memory.

21. The non-anchor node in claim 19, wherein the UE handover information is sent from the anchor node to the non-anchor node.

22. The non-anchor node in claim 19, wherein the first handover information element includes information in the first format indicating whether a handover of the UE connection to the second mobile radio communications system is permissible or not, and the second handover information element includes information in the second format indicating whether a handover of the UE connection to the first mobile radio communications system is permissible or not.

23. The non-anchor node in claim 19, wherein the first handover information element includes information in the first format indicating whether a handover of the UE connection to the second mobile radio communications system should not be performed unless no resources are available in the first mobile radio communications system, and the second handover information element includes information in the second format indicating whether a handover of the UE connection to the first mobile radio communications system should not be performed unless no resources are available in the second mobile radio communications system.

24. The non-anchor node in claim 19, wherein the first mobile radio communications system is a GSM mobile radio communications system and the second mobile radio communications system is a UTRAN or CDMA2000 mobile radio communications system.

25. The non-anchor node in claim 19, wherein the first mobile radio communications system is a UTRAN or CDMA2000 mobile radio communications system and the second mobile radio communications system is a GSM mobile radio communications system.

26. The non-anchor node in claim 19, wherein the first mobile radio communications system is a UTRAN or CDMA2000 mobile radio communications system and the second mobile radio communications system is a UTRAN or CDMA2000 mobile radio communications system.

27. The non-anchor node in claim 19, wherein the first mobile radio communications system is a GSM mobile radio communications system and the second mobile radio communications system is a GSM mobile radio communications system.

28. The non-anchor node in claim 19, wherein the first mobile radio communications system is one of a first, second, and third generation mobile radio communications system and the second mobile radio communications system is one of a first, second, and third generation mobile radio communications system.

29. The non-anchor node in claim 19, wherein the non-anchor node is a mobile services switching center (MSC) node.

30. A communications system comprising:
a GSM mobile radio communication system including a GSM supporting mobile services switching center (MSC) coupled to at least one base station controller (BSC) controlling plural radio base stations;
a UMTS terrestrial radio access network (UTRAN) mobile radio communication system including a UTRAN supporting MSC coupled to at least one radio network controller (RNC) controlling plural radio base stations; and
each radio base station capable of communicating with one or more mobile radio user equipments (UEs) over a radio interface;
wherein an ancho-MSC is configured to assist in establishing a radio connection between a first one of the GSM and UTRAN mobile radio communications systems and a user equipment (UE) and to process a handover of the UE connection from one of the BSC and the RNC to a second one of the GSM and UTRAN mobile radio communications systems;
wherein a non-anchor-MSC is configured to receive service handover information for the UE from the non-anchor MSC, where the UE service handover information is based on UE subscription information for a subscriber associated with the UE and a-mobile radio communications system operator information representing rights of the subscriber associated with the UE regarding changing between different types of radio access technologies and where the UE service handover information includes a GSM service handover information element indicating whether handover of the connection from the GSM mobile radio communications system to the UTRAN mobile radio communications system is permitted and a UTRAN service handover information element indicating whether handover from the UTRAN mobile radio communications system to the GSM mobile radio communications system is permitted;
wherein the non-anchor MSC is configured either to use the UE service handover information or to provide to another node the UE service handover information in order to determine whether to permit a subsequent handover of the connection for the second mobile radio communications system to the first mobile radio communications system without having to contact the UE or use statistical cell-related information, and wherein when the UE service handover information indicates that a requested handover is not permitted, the non-anchor MSC or the another node is configured to prevent the requested handover even though there may be sufficient resources to support the requested handover; and
wherein the anchor MSC is configured to send the UE service handover information to the non-anchor MSC in a mobile application part (MAP) protocol handover request message and wherein the MAP handover request message includes (1) a base station subsystem mobile application part (BSSMAP) protocol handover request message having a BSSMAP service handover information element as the GSM service handover information element and (2) a radio access network application part (RANAP) protocol service handover information element as the UTRAN service handover information element.

31. The communications system in claim 30, wherein the non-anchor MSC is configured to store the UE service handover information.

32. The communications system in claim 31, wherein non-anchor MSC is configured to receive a request for a handover of the UE connection to the another mobile radio communications system, and to forward the UE handover information to a node in the another mobile radio communications system.

33. The communications system in claim 30, wherein the anchor MSC is configured to encapsulate the RANAP relocation message having the RANAP service handover information element and add the BSSMAP service handover information element to the MAP prepare handover request message.

34. The communications system in claim 30, wherein the anchor MSC encapsulates the BSSMAP handover request message having the BSSMAP service handover information element and adds the RANAP service handover information element to the MAP prepare handover request message.

35. The communications system in claim 30, wherein the BSSMAP service handover information element indicates whether a handover of the UE connection to the UTRAN mobile radio communications system should not be performed unless no resources are available in the first mobile radio communications system, and the RANAP service handover information element indicates whether a handover of the UE connection to the GSM mobile radio communications system should not be performed unless no resources are available in the second mobile radio communications system.

36. The communications system in claim 30, wherein the BSSMAP service handover information element indicates whether a handover of the UE connection to the UTRAN mobile radio communications system is desired, and the RANAP service handover information element indicates whether a handover of the UE connection to the GSM mobile radio communications system is desired.

37. The communications system in claim 30, wherein the BSSMAP service handover information element indicates whether a handover of the UE connection to the UTRAN mobile radio communications system is permissible, and the RANAP service handover information element indicates whether a handover of the UE connection to the GSM mobile radio communications system is permissible.

* * * * *

UNITED STATES PATENT AND TRADEMARK OFFICE
CERTIFICATE OF CORRECTION

PATENT NO. : 7,257,403 B2
APPLICATION NO. : 10/137703
DATED : August 14, 2007
INVENTOR(S) : Nikkelen It is certified that error appears in the above-identified patent and that said Letters Patent is hereby corrected as shown below:

On Page 2, in Field (56), under "OTHER PUBLICATIONS", in Column 1, Line 15, delete "State" and insert -- Station --, therefor.

On Page 2, in Field (56), under "OTHER PUBLICATIONS", in Column 2, Line 3, after "1999)" insert -- , --.

On Page 2, in Field (56), under "OTHER PUBLICATIONS", in Column 2, Line 6, delete "Mobil" and insert -- Mobile --, therefor.

On Page 2, in Field (56), under "OTHER PUBLICATIONS", in Column 2, Line 15, after "Sweden" insert -- , --.

In Column 11, Line 32, in Claim 12, delete "systems" and insert -- system --, therefor.

In Column 13, Line 2, in Claim 19, delete "communication" and insert -- communications --, therefor.

In Column 13, Line 3, in Claim 19, delete "systems" and insert -- system --, therefor.

In Column 14, Line 20, in Claim 30, delete "ancho" and insert -- anchor --, therefor.

In Column 14, Lines 22-23, in Claim 30, delete "systems" and insert -- system --, therefor.

In Column 14, Line 26, in Claim 30, delete "systems" and insert -- system --, therefor.

UNITED STATES PATENT AND TRADEMARK OFFICE
CERTIFICATE OF CORRECTION

PATENT NO. : 7,257,403 B2
APPLICATION NO. : 10/137703
DATED : August 14, 2007
INVENTOR(S) : Nikkelen It is certified that error appears in the above-identified patent and that said Letters Patent is hereby corrected as shown below:

In Column 14, Line 31, in Claim 30, delete "a-mobile" and insert -- mobile --, therefor.

In Column 14, Line 49, in Claim 30, delete "for" and insert -- from --, therefor.

Signed and Sealed this

Twenty-seventh Day of May, 2008

JON W. DUDAS
*Director of the United States Patent and Trademark Office*